US012175503B2

(12) United States Patent
Majusiak et al.

(10) Patent No.: US 12,175,503 B2
(45) Date of Patent: Dec. 24, 2024

(54) ONBOARDING PLATFORM WITH ARTIFICIAL INTELLIGENT INTEGRATION FOR TRANSITIONING

(71) Applicant: BANK OF AMERICA CORPORATION, Charlotte, NC (US)

(72) Inventors: Meredith McIntosh Majusiak, Avondale, PA (US); Keelyn Griffin, Newark, DE (US); Brian J. Kehner, Wilmington, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 199 days.

(21) Appl. No.: 17/719,065

(22) Filed: Apr. 12, 2022

(65) Prior Publication Data
US 2022/0327587 A1 Oct. 13, 2022

Related U.S. Application Data

(60) Provisional application No. 63/173,675, filed on Apr. 12, 2021.

(51) Int. Cl.
*G06Q 30/00* (2023.01)
*G06Q 10/0637* (2023.01)
*G06Q 30/018* (2023.01)
*G06Q 30/0201* (2023.01)
*G06Q 30/0282* (2023.01)

(52) U.S. Cl.
CPC ..... *G06Q 30/0282* (2013.01); *G06Q 10/0637* (2013.01); *G06Q 30/018* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 8,341,080 B2 | 12/2012 | Johns et al. | |
| 10,482,500 B1 | 11/2019 | Bonzi | |
| 11,095,528 B2 | 8/2021 | Kundu et al. | |
| 11,308,665 B2 | 4/2022 | Kazem et al. | |
| 11,694,256 B1 | 7/2023 | Hill et al. | |
| 2011/0208603 A1* | 8/2011 | Benefield | G06Q 20/202 715/705 |

(Continued)

OTHER PUBLICATIONS

Accenture helps Britannia digitise manufacturing units, warehouses, ICT Monitor Worldwide Amman: SyndiGate Media Inc. (Sep. 29, 2021). (Year: 2021).*

(Continued)

*Primary Examiner* — Matthew T Sittner
(74) *Attorney, Agent, or Firm* — Moore & Van Allen PLLC; Nicholas C. Russell

(57) ABSTRACT

Embodiments of the invention are directed to a system, method, or computer program product for multi-channel cognitive resource application integration for digital onboard landing across platforms. The system allows the user a wholistic business outlook view for visualization and application of an onboarding journey leveraging artificial intelligence associated with the multi-channel cognitive resource platform to aid in onboarding and the push/pull dynamic timing. The system generates and integrates a direct contact within a contact list on a user device for direct linkage to the provider.

15 Claims, 4 Drawing Sheets

(56) References Cited

U.S. PATENT DOCUMENTS

| | | | |
|---|---|---|---|
| 2011/0225636 A1 | 9/2011 | Keith et al. | |
| 2011/0270763 A1* | 11/2011 | Graham, III | G06Q 20/3829 |
| | | | 705/71 |
| 2012/0004973 A1 | 1/2012 | Postrel | |
| 2014/0278513 A1* | 9/2014 | Prakash | G06Q 30/0601 |
| | | | 705/2 |
| 2015/0348182 A1* | 12/2015 | Cismas | G06Q 40/02 |
| | | | 705/35 |
| 2016/0036750 A1* | 2/2016 | Yuan | H04L 51/52 |
| | | | 709/206 |
| 2018/0114127 A1* | 4/2018 | Cole | H04L 67/52 |
| 2018/0129943 A1 | 5/2018 | La Placa | |
| 2019/0332433 A1* | 10/2019 | Nadimpalli | G06F 9/5038 |
| 2019/0333614 A1 | 10/2019 | Burger et al. | |
| 2020/0321120 A1 | 10/2020 | Neumann | |
| 2021/0209682 A1* | 7/2021 | Jain | H04L 9/0637 |
| 2022/0122060 A1 | 4/2022 | Bohra et al. | |
| 2022/0172219 A1* | 6/2022 | Hsu | G06Q 30/0204 |
| 2022/0366489 A1 | 11/2022 | Phillips et al. | |
| 2022/0400139 A1* | 12/2022 | Walling | H04L 67/53 |
| 2023/0097322 A1 | 3/2023 | Hum et al. | |
| 2023/0199074 A1 | 6/2023 | Amir-Siddiqi et al. | |

OTHER PUBLICATIONS

Paravision expands facial recognition presence in Europe with new executive, Executive Appointments Monitor Worldwide Amman: SyndiGate Media Inc. (Nov. 3, 2021). (Year: 2021).*

* cited by examiner

300

```
┌─────────────────────────────────────────────────────────┐
│ PROVIDE A MULTI-CHANNEL COGNITIVE RESOURCE APPLICATION ON A │
│ USER DEVICE ASSOCIATED WITH THE USER, WHEREIN THE MULTI-│
│ CHANNEL COGNITIVE RESOURCE APPLICATION IS CONFIGURED TO │
│ PRESENT A CENTRAL USER INTERFACE ON A DISPLAY DEVICE OF THE │
│                      USER DEVICE                         │
│                          302                             │
└─────────────────────────────────────────────────────────┘
                              │
                              ▼
┌─────────────────────────────────────────────────────────┐
│  CONDUCT, VIA THE CENTRAL USER INTERFACE, A FIRST        │
│           CONVERSATION WITH THE USER                     │
│                        304                               │
└─────────────────────────────────────────────────────────┘
                              │
                              ▼
┌─────────────────────────────────────────────────────────┐
│ ANALYZE THE NATURAL LANGUAGE OF A FIRST ACTIVITY INPUT   │
│ RECEIVED FROM THE USER TO DETERMINE THE FIRST USER ACTIVITY │
│           THAT THE USER SEEKS TO PERFORM                 │
│                        306                               │
└─────────────────────────────────────────────────────────┘
                              │
                              ▼
┌─────────────────────────────────────────────────────────┐
│ INITIATE COMPLETION OF THE FIRST USER ACTIVITY WITHIN THE │
│ CENTRAL USER INTERFACE OF THE MULTI-CHANNEL COGNITIVE    │
│              RESOURCE APPLICATION                        │
│                        308                               │
└─────────────────────────────────────────────────────────┘
```

Figure 4

ONBOARDING PLATFORM WITH ARTIFICIAL INTELLIGENT INTEGRATION FOR TRANSITIONING

CROSS-REFERENCE TO RELATED APPLICATIONS

This application is a U.S. Non-provisional application claiming priority to U.S. Provisional Patent Application No. 63/173,675, filed Apr. 12, 2021 titled Onboarding Platform with Artificial Intelligent Integration for Transitioning, the contents of which are hereby incorporated by reference in its entirety.

BACKGROUND

With advancements in machine and product development, more and more machines and products are being implemented by businesses. The expansion of small businesses within the internet and product development continues to grow. Managing the requirements of a business, especially a small business, continues to require communications with third party entities for management of the business.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to a system, method, or computer program product for digital onboarding across platforms. The system creates an onboarding digital landing page for small businesses that leverages information about the small business and artificial intelligence including a multi-channel cognitive resource platform integration to provide a digital landing for the user to provide a wholistic view of a business. The system allows the small business to visualize their entire onboarding journey to onboarding into products. The system integrates a multi-channel cognitive resource platform into onboarding process. This leverages artificial intelligence associated with the multi-channel cognitive resource platform to aid in onboarding of the business products and provide future steps for the user. The multi-channel cognitive resource platform would push next steps and assist in onboarding the user by providing next steps and direction to the user. Furthermore, the system automatically transfers any items that may need to be transferred to the new products, such as transferring automatic deposit accounts, utility information, or the like which allows for expedited sending and receiving information for onboarding. During onboarding the system identifies user needs and pushes appropriate products at appropriate times. In this way, the system provides logic to push to get products and options based on user requirements.

Finally, the platform generates and integrates a business contact within contact list on mobile device of a user associated with the business. The platform, via the multi-channel cognitive resource platform, provides a user with a link to add the small business contact to the user's contact list so that the user has a direct line to the provider.

The invention further provides an onboarding platform for business user experience tailoring. Using the onboarding platform, the entity may be able to provide a tailored user experience that curated suggestions to provide better user experience. Thus providing an automated and integrated onboarding experience for seamless user onboarding while utilizing the multi-channel cognitive resource platform.

In some embodiments, the onboarding platform may include a centralized database used for user experience and data access. The centralized database may store all the entity products, triggers for all of the products, and the like. The system may go further than identification of the user being a business owner. The system may further identify the specific business and specific needs for that business. For example, a computer store owner may have different business needs than a dentist office. The platform may include an artificial intelligent engine that may process attributes about the business, such as the type of business, size, receivables, employees, and the like to identify similar attributes of those business and provide user with similar options and adjustments.

Embodiments of the invention relate to systems, methods, and computer program products for providing a digital onboarding using multi-channel cognitive resource applications, the invention comprises: generating a digital onboarding platform and link the digital onboarding platform to the multi-channel cognitive resource application; onboarding the user to the digital onboarding platform for processing product onboarding; pushing stage processing of onboarding of product to the user via the multi-channel cognitive resource application; integrating stage processing into a user device and display the multi-channel cognitive resource application on the user device upon pushing; and identifying user program needs during onboarding and push products at appropriate times associated with user program needs.

In some embodiments, the digital onboarding platform further recognizes user activity as being related to a business product onboarding and transmit an audio and display information to the user based on the user activity.

In some embodiments, the invention further comprises integrating a contact into the user device associated with the user for direct communication for onboarding.

In some embodiments, the invention further comprises automatically transferring user items that to new products, wherein the transferring user items includes automatic deposit accounts and utility information.

In some embodiments, pushing the products at appropriate times associated with user program needs further comprises applying logic to user onboarding and identifying products for user requirements.

In some embodiments, the invention further comprises an artificial intelligent engine to process user onboard attributes including size, receivables, and employees associated with the user to provide product adjustments and comparisons.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
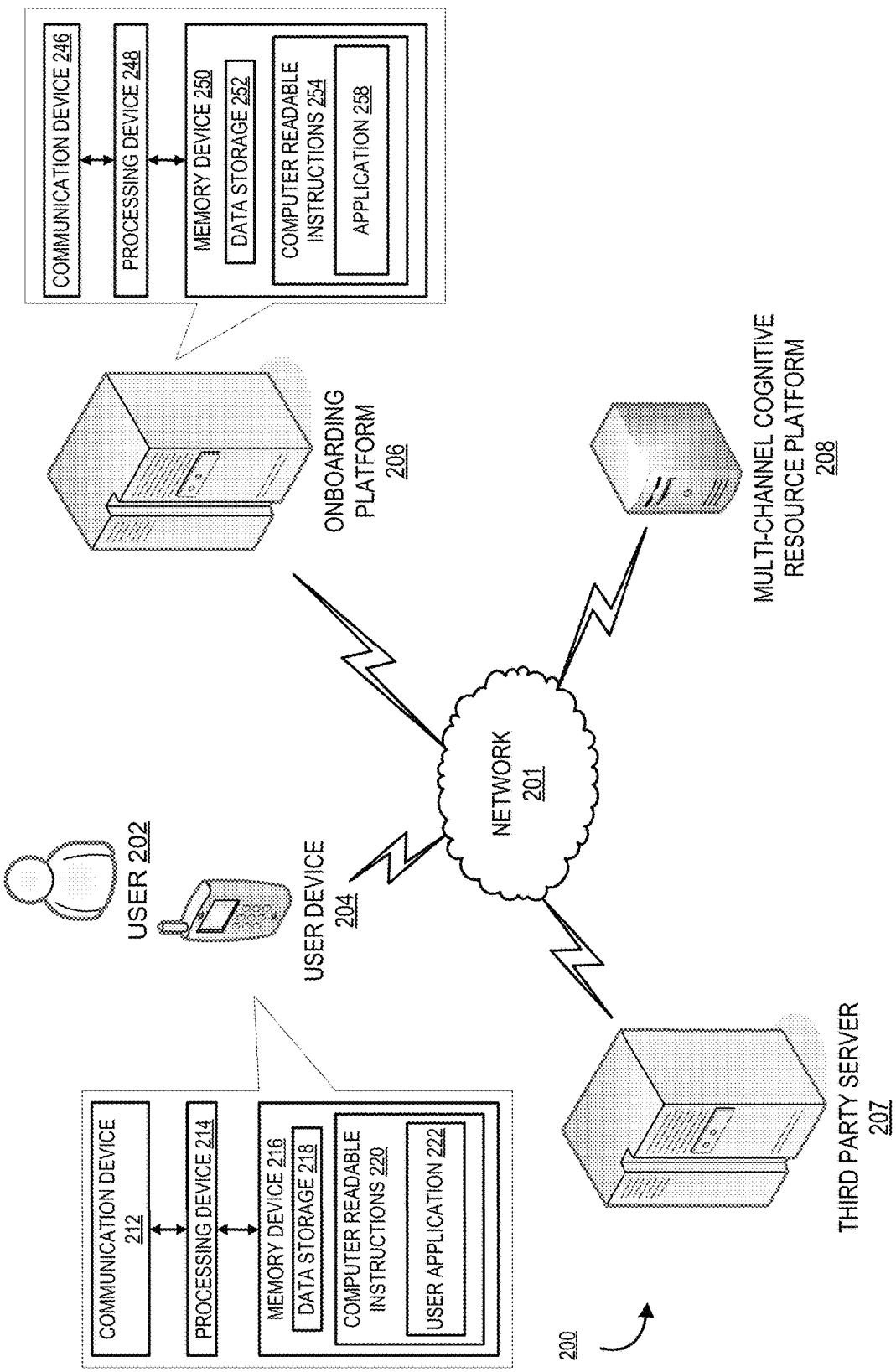
Figure 2:
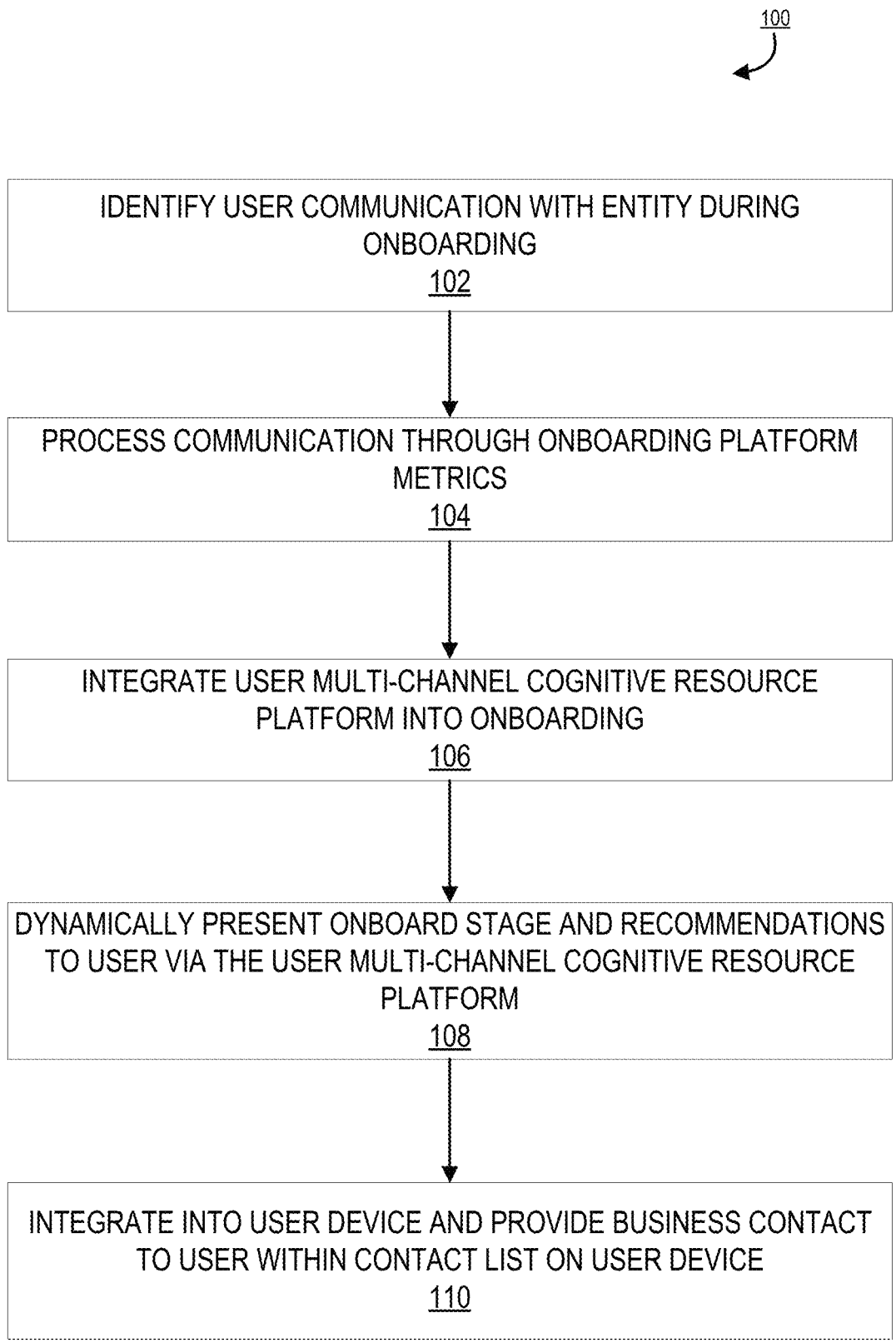
Figure 3:
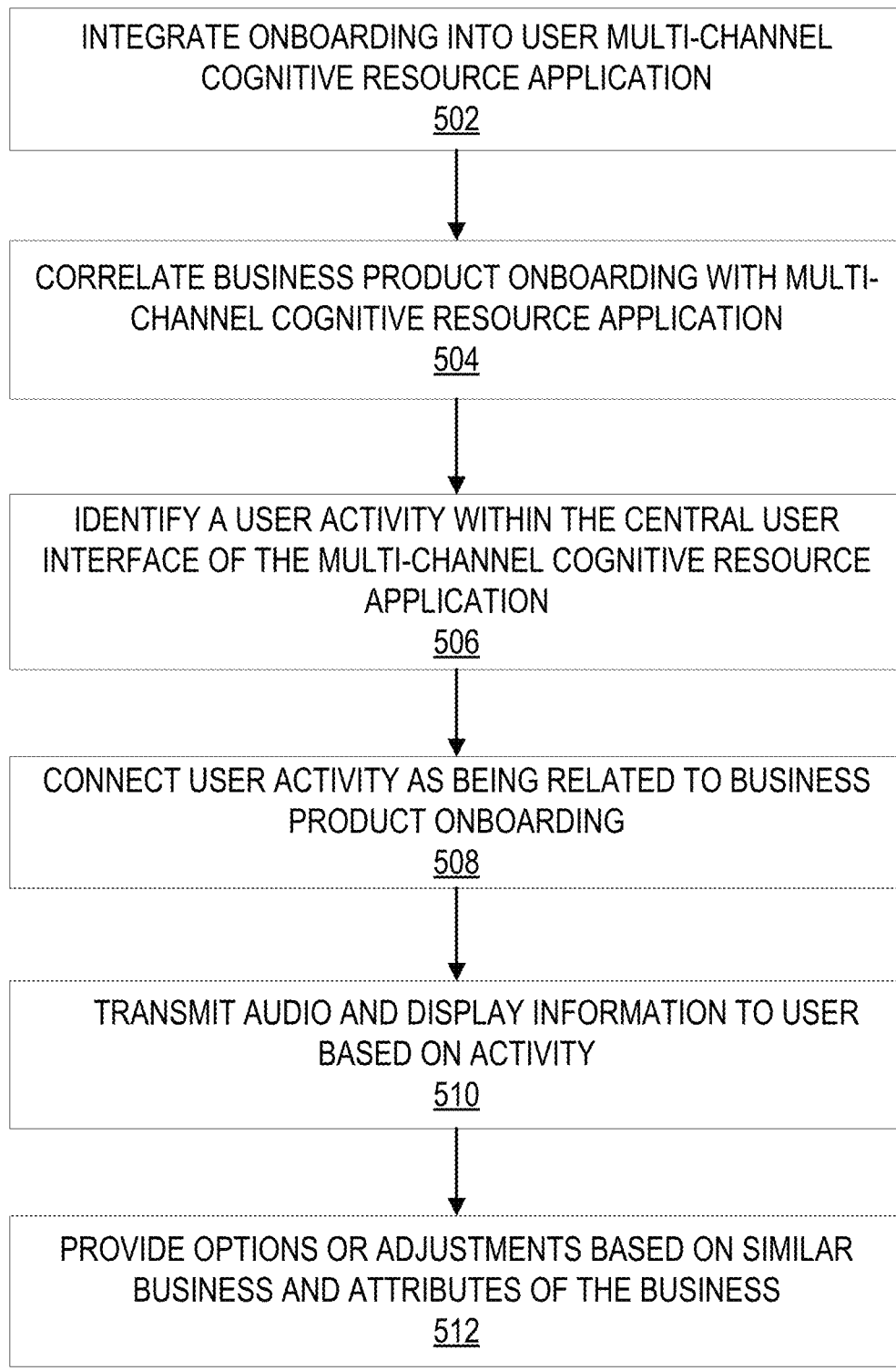

Having thus described embodiments of the invention in general terms, reference will now be made to the accompanying drawings, wherein:

FIG. 1 provides a digital onboarding platform with multi-channel cognitive resource platform integration system environment, in accordance with one embodiment of the present invention;

FIG. 2 provides a high level process flow illustrating the artificial intelligent digital onboarding process, in accordance with one embodiment of the present invention;

FIG. 3 provides a process map illustrating coordinating the onboarding process with the multi-channel cognitive resource application for user business, in accordance with one embodiment of the present invention; and FIG. 4 provides a high level process flow illustrating the multi-channel cognitive resource application, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any entity or individual associated with a business. In some embodiments, the user may be the business. In some embodiments, the user may be an individual associated with the business. In some embodiments, the business may be a small business, such as one with under 500 employees. In yet other embodiments, the business may be a larger business, such as one with 500 or more employees. In some embodiments, identities of an individual may include online handles, usernames, aliases, family names, maiden names, nicknames, or the like. Furthermore, as used herein the term "user device" or "mobile device" may refer to mobile phones, personal computing devices, tablet computers, wearable devices, and/or any portable electronic device capable of receiving and/or storing data therein associated with the business.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

FIG. 1 illustrates a digital onboarding platform with multi-channel cognitive resource platform integration system environment, in accordance with one embodiment of the present invention 200, in accordance with one embodiment of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of digital onboarding across platforms.

As illustrated in FIG. 1, the multi-channel cognitive resource platform 208 is operatively coupled, via a network 201 to the user device 204, third party servers 207, and to the onboarding platform 206. In this way, the multi-channel cognitive resource platform 208 can send information to and receive information from the user device 204, third party servers 207, and the onboarding platform 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has one or more user devices 204 and is in communication with an entity. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the onboarding platform 206, the multi-channel cognitive resource platform 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the onboarding platform 206.

As further illustrated in FIG. 1, the onboarding platform 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the multi-channel cognitive resource platform 208, the third party server 207, and the user device 204. As such, the communication device 246 generally comprises a modem, server, or other device for communicating with other devices on the network 201.

As further illustrated in FIG. 1, the onboarding platform 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the onboarding platform 206 the memory device 250 stores an application 258. In one embodiment of the invention, the application 258 may associate with applications having computer-executable program code that generate and code a tag for implementation onto a product. Furthermore, the onboarding platform 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more multi-channel cognitive resource platform 208, third party servers 207, and/or user device 204.

In the embodiment illustrated in FIG. 1 and described throughout much of this specification, the application 258 may generate and display a dashboard on the user device 204 via a communication channel through the network 201. The communication channel may be closed and secure, such that the application 258 may present sensitive user or business information about resources and the like to the user device 204.

As illustrated in FIG. 1, the third party server 207 is connected to the multi-channel cognitive resource platform 208, user device 204, and onboarding platform 206. The third party server 207 has the same or similar components as described above with respect to the user device 204 and the onboarding platform 206. While only one third party server 207 is illustrated in FIG. 1, it is understood that multiple third party servers 207 may make up the system environment 200. The third party server 207 may be associated with one or more third party entities, third party financial institutions, or the like.

As illustrated in FIG. 1, the multi-channel cognitive resource platform 208 is connected to the third party server 207, user device 204, and onboarding platform 206. The multi-channel cognitive resource platform 208 may be associated with the onboarding platform 206 providing entity. The multi-channel cognitive resource platform 208 has the same or similar components as described above with respect to the user device 204 and the onboarding platform 206. It is understood that the servers, systems, and devices described herein illustrate one embodiment of the invention. It is further understood that one or more of the servers, systems, and devices can be combined in other embodiments and still function in the same or similar way as the embodiments described herein. The multi-channel cognitive resource platform 208 may generally include a processing device communicably coupled to devices as a memory device, output devices, input devices, a network interface, a power source, one or more chips, and the like. The multi-channel cognitive resource platform 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the multi-channel cognitive resource platform 208 described herein.

FIG. 4 provides a high level process flow illustrating the artificial intelligent digital onboarding process 100, in accordance with one embodiment of the present invention. As illustrated in block 102, the process is initiated by identifying a user communication with an entity during an onboarding process. In this way, a user may be communication with an entity via one of various communication channels, such as in person, on the phone, over the internet, text, or the like. The user may be a current customer of the entity or may be a new customer of the entity. The user may be being on boarded for a product or service provided by the entity.

As illustrated in block 104, the process continues by processing the communications through the platform and performing onboarding platform metrics on the communications. In this way, the system may identify the communications of the user and store the communications. The communications may be analyzed in order to identify one or more products or services the user may be interested in. These may be products or services ancillary to the current product the user is being on boarded. The products or services may be based on the current products of the user or based on comments the user communicates during the communication. The system creates an onboarding digital landing page for small businesses that leverages information about the small business and artificial intelligence including a multi-channel cognitive resource platform integration to provide a digital landing for the user to provide a wholistic view of a business. The system allows the small business to visualize their entire onboarding journey to onboarding into products.

As illustrated in block 106, the process 100 continues by integrating user multi-channel cognitive resource platforms into the onboarding program. The multi-channel cognitive resource platform is further described in further detail below. The multi-channel cognitive resource platform may be able to integrate the onboarding for the user in order to provide the user with next steps for the onboarding process, products for the user to utilize, and a platform for user visualization for all products and performance for the user business. The system integrates a multi-channel cognitive resource platform into onboarding process. This leverages artificial intelligence associated with the multi-channel cognitive resource platform to aid in onboarding of the business products and provide future steps for the user. The multi-channel cognitive resource platform would push next steps and assist in onboarding the user by providing next steps and direction to the user. Furthermore, the system automatically transfers any items that may need to be transferred to the new products, such as transferring automatic deposit accounts, utility information, or the like which allows for expedited sending and receiving information for onboarding. During onboarding the system identifies user needs and pushes appropriate products at appropriate times. In this way, the system provides logic to push to get products and options based on user requirements.

As illustrated in block 108, the process 100 continues by dynamically presenting onboarding stage and recommendations to the user via the user multi-channel cognitive resource platform. In this way, the user multi-channel cognitive resource platform may provide the user with information regarding the business, product recommendations, and the like via a voice activated user multi-channel cognitive resource platform.

Next, as illustrated in block 110, the process 100 is finalized by integrating into the user device and providing a business contact to the user within the contact list of the user device. In this way, the platform generates and integrates a business contact within contact list on mobile device of a user associated with the business. The platform, via the multi-channel cognitive resource platform, provides a user with a link to add the small business contact to the user's contact list so that the user has a direct line to the provider. The system integrates a multi-channel cognitive resource platform into onboarding process FIG. 3 provides a high level process flow illustrating coordinating the onboarding process with the multi-channel cognitive resource application for user business 500, in accordance with one embodiment of the present invention. As illustrated in block 502, the process 500 is initiated by integrating business onboarding into the user's multi-channel cognitive resource application. In this way, the system links the user business information from the platform into the multi-channel cognitive resource application for user visualization of onboarding. The multi-channel cognitive resource application is further detailed below with respect to FIG. 4.

As illustrated in block 504, the process 500 continues by correlating the business product onboarding with the multi-channel cognitive resource application. In this way, the multi-channel cognitive resource application may notify the user of reminders of onboarding steps upcoming, current products, recommended products, and the like.

The user may interact with the onboarding system via the multi-channel cognitive resource application. The multi-channel cognitive resource application may identify a user activity within the central user interface of the multi-channel cognitive resource application related to the user business, as illustrated in block 506. The user may communicate via voice, user device, or the like with the multi-channel cognitive resource application for onboarding.

As illustrated in block 508, the process 500 continues by connecting the user activity as being related to business product onboarding. In this way, the multi-channel cognitive resource application recognized the user activity as being related to business product onboarding and the system transmits audio and display information to the user based on the activity, as illustrated in block 510. Finally, as illustrated in block 512, the process 500 is finalized by providing options or adjustments based on similar business and attributes of the business.

FIG. 4 provides a high level process flow illustrating the multi-channel cognitive resource application integration into the digital onboarding platform 300, in accordance with one embodiment of the present invention. As indicated by block 302, the system is configured to provide a multi-channel cognitive resource application or user application on a user device associated with the user for presenting an onboarding digital landing page. Providing the application may comprise transmitting, installing, storing, initiating and/or opening the user application on the user device. The multi-channel cognitive resource application is further configured to present a central user interface on a display device of the user device to provide onboarding information for a business. In some instances, the user device is configured to present the multi-channel cognitive resource application, and the central user interface based on receiving control instructions from the system. In some instances, the multi-channel cognitive resource application may be running in the background on the user device, and the control instructions may cause the multi-channel cognitive resource application stored on the user device to present the central user interface on the display of the user device, automatically. In some embodiments, prior to initiating the presentation of the central user interface, the system may modify an existing display to allow the user to choose to, or prevent the user application from opening. The modification of the existing displays may comprise locking the screen for a predetermined period of time (such as 10 seconds) or until the user acquiesces the opening of the application by user voice, touch, or gesture commands. In addition, the system may also dim the brightness of the existing display for a predetermined period of time (such as 10 seconds) or until the user acquiesces the opening of the application by user voice, touch, or gesture commands, thereby reducing power requirements and drawing the user's attention. In some embodiments, based on determining that the user device does not comprise a multi-channel cognitive resource application, the system may transmit control instructions that cause the user device and/or facilitate the user to download and install the user integrated application.

In this regard, in some embodiments, the system may initialize the multi-channel cognitive resource application or cause presentation of the central user interface based on determining that the user seeks to initiate a user activity associated with business onboarding. In this regard, the system and/or the user device may identify that the user seeks onboarding of products for business. In some instances, the mobile device may determine that the user seeks to initiate a user activity based on receiving a wireless signal from a physical transmitter device associated with a resource entity, via a wireless network.

Next, the system is configured to conduct, via the central user interface, a first conversation with the user, as illustrated by block 304. As discussed previously, the central user interface is a computer human interface, and specifically a natural language/conversation user interface for receiving user input (for example, for creating, selecting and modifying data/functionality), presenting information regarding business activities, providing output to the business, and otherwise communicating with the user in a natural language of the user, via suitable communication mediums such as audio, textual, and the like onboarding of the business in products. A "conversation" as referred to herein may comprise receiving a user input using a suitable communication channel/medium, providing an output to the user using a suitable communication channel/medium, a dialog or interchange comprising receiving one or more user input and providing relevant one or more outputs, and the like. Typically, the conversation components, i.e., the user input received and the output provided by the application are in the natural language of the user, often comprising linguistic phenomena such as verbs, phrases and clauses, as will be described below. As such, the system is configured for natural language communication across multiple communication channels (such as, speech/audio, text, and the like), and is configured to switch between them seamlessly and in real-time, during the conversation.

Conducting the conversation with the user comprises receiving, via the central user interface, a first activity input or user input from the user regarding initiation of a first user activity or product associated with a user business, wherein the activity input is received through a first communication medium. For example, the system is configured for communication using an audio communication medium, via an audio communication channel. In this regard, the system may receive the user activity input in the form of voice input having natural speech (for example, sentences, phrases, and the like) of the user, captured using a communication device of the user device such as a microphone. Similarly, the system is configured communication using a for textual communication medium, via a textual communication channel. Here, the user may provide user input by entering text in a natural language of the user, using a user input device such as a keypad or the display screen of the device itself. In some instances, in response to receiving the activity input, the system is configured to present the received activity input on the central user interface. For example, the system may transform/convert the received audio input into a textual form and initiate a presentation of the transformed input on the central user interface. Similarly, the system may present the received textual input on the central user interface. In this way, the system may construct a conversation log on the central user interface comprising the received activity input from the user and output provided by the system. In response to receiving the activity input from the user, such as an audio input or textual input from the user, the system may provide output to the user in an audio form, in a visual/textual form, or both. Furthermore, the multi-channel cognitive resource application may review use business models, products, and the like and provide the user with suggestions and next steps for enrollment into products or next steps in the onboarding process of a current product onboard. The system further provides timing for the same.

The system is configured to receive, recognize and interpret these linguistic phenomena of the user input and perform user activities accordingly. In this regard, the system is configured for natural language processing and computational linguistics. Based on analyzing the received activity input, the system is configured to determine the user activity that the user seeks to perform, as indicated by block 306. Here, in general, the system may parse the activity input from the user to detect one or more words that make up the activity input from the user. The system may then analyze words to determine the user activity.

Specifically, based on receiving the activity input from the user, in some instances, the system is configured to generate a parse tree based on detected one or more words and/or the detected keywords. A parse tree is a data structure that allows the system to accurately analyze activity input. For example, the parse tree may indicate the various language structures, such as clauses, phrases, subjects, verbs, and objects in a spoken statement and identify the words in each language structure. The system may analyze the parse tree to determine the user activity to be performed and the intent of the user and also to determine any parameters provided by the user for an invoked service. The system may invoke another application, a service, an activity functionality and the like based on its analysis of parse tree. The system may also initialize the invoked application/service/functionality with any parameters detected in parse tree. Initializing the invokes application/service/functionality comprising extracting pertinent elements from relevant applications on the user device, embedding/inserting the pertinent elements and one or more interactive elements, dynamically, into the central user interface in a suitable order, and facilitating completion of the user activity from within the central user interface, without requiring opening and closing of multiple applications or widgets.

Next, the system initiates completion of the first user activity within the central user interface of the multi-channel cognitive resource application, as indicated at block 308. In some embodiments, the system is configured to identify one or more discrete activity events to be carried out for performing the first user activity with respect to a user business. The system may then present outputs within the central user interface to request the information from the user, in a suitable order.

In this regard, the integrated user application is configured to dynamically integrate, or embed, data and functionality (action buttons or tools such as, other interface elements), entity identifiers (such as logos, images and the like) of resource entity applications or applications/widgets stored on the user device within the centralized user interface. As such, the application is configured to present the conversation, functionality of the multi-channel cognitive resource application, user activity inputs, outputs, along with functionality/elements extracted from other applications or resource entity applications. Here, the integrated user application is configured to dynamically integrate, or embed, resource entity interfaces, one after another in a sequence, based on a determined progression of the user activity and activity events. In some instances, the integrated user application may load only required portions of the entity applications in a cache memory location, one after another. The user application is further configured to close out or unload each resource entity application from memory after completion of associated activity event. Therefore, because the present invention does not require opening of multiple interfaces, and because the present invention does not require the resource entity applicants to be running in the background throughout the user activity, the present user application provides an improvement to exiting user activity processing, and an increase in processing speeds and a reduction in memory requirements and processing time for the mobile device.

As discussed, the system is further configured to authenticate the user for the user activity, either before or during the activity. In this regard, the user application is configured to provide centralized authentication, without requiring separate credentials for each resource entity application associated with the user activity related to the business. In some embodiments, the system is configured to identify the one or more activity events and the one or more external applications or resource entity applications required, for completing the activity events, prior to commencing the activity events. Here, the integrated user application is configured to determine authentication requirements of each of the identified one or more applications associated with completing the user activity. The integrated user application may then identify a highest level of authentication among the applications.

The system creates an onboarding digital landing page for small businesses that leverages information about the small business and artificial intelligence including a multi-channel cognitive resource platform integration to provide a digital landing for the user to provide a wholistic view of a business. The system allows the small business to visualize their entire onboarding journey to onboarding into products. The system integrates a multi-channel cognitive resource platform into onboarding process. This leverages artificial intelligence associated with the multi-channel cognitive resource platform to aid in onboarding of the business products and provide future steps for the user. The multi-channel cognitive resource platform would push next steps and assist in onboarding the user by providing next steps and direction to the user. Furthermore, the system automatically transfers any items that may need to be transferred to the new products, such as transferring automatic deposit accounts, utility information, or the like which allows for expedited sending and receiving information for onboarding. During onboarding the system identifies user needs and pushes appropriate products at appropriate times. In this way, the system provides logic to push to get products and options based on user requirements.

Finally, the platform generates and integrates a business contact within contact list on mobile device of a user associated with the business. The platform, via the multi-channel cognitive resource platform, provides a user with a link to add the small business contact to the user's contact list so that the user has a direct line to the provider.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for providing a digital onboarding using multi-channel cognitive resource applications, the system comprising:
    a memory device with computer-readable program code stored thereon;
    a communication device;
    a processing device operatively coupled to the memory device and the communication device, wherein the processing device is configured to execute the computer-readable program code to:
        generate a digital onboarding platform and link the digital onboarding platform to the multi-channel cognitive resource application;
        onboard the user to the digital onboarding platform for processing product onboarding, wherein onboarding the user further comprises using an artificial intelligence engine to process user onboard attributes including size, receivables, and employees associated with the user to provide product adjustments and comparisons;
        push stage processing of onboarding of product to the user via the multi-channel cognitive resource application;
        integrate stage processing into a user device and display the multi-channel cognitive resource application on the user device upon pushing;
        identify user program needs during onboarding and push products at appropriate times associated with user program needs during onboarding, wherein pushing the products at the appropriate times associated with the user program needs comprises applying logic to user onboarding and identifying products for user requirements;
        identify user activity and communications as being related to onboarding, and trigger the multi-channel cognitive resource application access of the user activity, wherein the multi-channel cognitive resource application transmits audio and displays information to the user device about the user activity relative to onboarding based on identifying that the user initiates the user activity being related to the onboarding;
        analyze the identified user activity and communications to identify products ancillary to the pushed products based on comments in the user activity and communications and present the products ancillary to the pushed products on a digital landing on the user device; and
        generate and display a link, wherein upon a condition where the user interacts with the link, a contact is integrated into the user device associated with the user for direct communication for onboarding.

2. The system of claim 1, further comprising automatically transferring user items to new products, wherein the transferring user items includes automatic deposit accounts and utility information.

3. The system of claim 1, wherein the user is an entity selling products or services.

4. The system of claim 2, wherein the transferring user items expedites the push stage processing of the onboarding of the product to the user.

5. The system of claim 3, wherein the user onboard attributes processed by the artificial intelligence engine further comprises a type of business of the entity.

6. A computer program product for providing a digital onboarding using multi-channel cognitive resource applications, the computer program product comprising at least one non-transitory computer readable medium having computer-readable program code portions embodied therein, the computer-readable program code portions comprising:
    an executable portion configured for generating a digital onboarding platform and linking the digital onboarding platform to the multi-channel cognitive resource application;
    an executable portion configured for onboarding the user to the digital onboarding platform for processing product onboarding, wherein onboarding the user further comprises using an artificial intelligence engine to process user onboard attributes including size, receivables, and employees associated with the user to provide product adjustments and comparisons;
    an executable portion configured for pushing stage processing of onboarding of product to the user via the multi-channel cognitive resource application;
    an executable portion configured for integrating stage processing into a user device and display the multi-channel cognitive resource application on the user device upon pushing;
    an executable portion configured for identifying user program needs during onboarding and push products at appropriate times associated with user program needs during onboarding, wherein pushing the products at the appropriate times associated with the user program needs comprises applying logic to user onboarding and identifying products for user requirements;
    an executable portion configured for identifying user activity and communications as being related to onboarding, and trigger the multi-channel cognitive resource application access of the user activity, wherein the multi-channel cognitive resource application transmits audio and displays information to the user device about the user activity relative to onboarding based on identifying that the user initiates the user activity being related to the onboarding;
    an executable portion configured for analyzing the identified user activity and communications to identify products ancillary to the pushed products based on comments in the user activity and communications and present the products ancillary to the pushed products on a digital landing on the user device; and an executable portion configured for generating and displaying a link, wherein upon a condition where the user interacts with the link, a contact is integrated into the user device associated with the user for direct communication for onboarding.

7. The computer program product of claim 6, further comprising an executable portion configured for automatically transferring user items to new products, wherein the transferring user items includes automatic deposit accounts and utility information.

8. The computer program product of claim 6, wherein the user is an entity selling products or services.

9. The computer program product of claim 7, wherein the transferring user items expedites the push stage processing of the onboarding of the product to the user.

10. The computer program product of claim 8, wherein the user onboard attributes processed by the artificial intelligence engine further comprises a type of business of the entity.

11. A computer-implemented method for providing a digital onboarding using multi-channel cognitive resource applications, the computer-implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating a digital onboarding platform and linking the digital onboarding platform to the multi-channel cognitive resource application;

onboarding the user to the digital onboarding platform for processing product onboarding, wherein onboarding the user further comprises using an artificial intelligence engine to process user onboard attributes including size, receivables, and employees associated with the user to provide product adjustments and comparisons;

pushing stage processing of onboarding of product to the user via the multi-channel cognitive resource application;

integrating stage processing into a user device and display the multi-channel cognitive resource application on the user device upon pushing;

identifying user program needs during onboarding and push products at appropriate times associated with user program needs during onboarding, wherein pushing the products at the appropriate times associated with the user program needs comprises applying logic to user onboarding and identifying products for user requirements;

identifying user activity and communications as being related to onboarding, and trigger the multi-channel cognitive resource application access of the user activity, wherein the multi-channel cognitive resource application transmits audio and displays information to the user device about the user activity relative to onboarding based on identifying that the user initiates the user activity being related to the onboarding;

analyzing the identified user activity and communications to identify products ancillary to the pushed products based on comments in the user activity and communications and present the products ancillary to the pushed products on a digital landing on the user device; and generating and displaying a link, wherein upon a condition where the user interacts with the link, a contact is integrated into the user device associated with the user for direct communication for onboarding.

12. The computer-implemented method of claim 11, further comprising automatically transferring user items to new products, wherein the transferring user items includes automatic deposit accounts and utility information.

13. The computer-implemented method of claim 11, wherein the user is an entity selling products or services.

14. The method of claim 12, wherein the transferring user items expedites the push stage processing of the onboarding of the product to the user.

15. The method of claim 13, wherein the user onboard attributes processed by the artificial intelligence engine further comprises a type of business of the entity.

* * * * *